(12) United States Patent
Gope et al.

(10) Patent No.: US 10,706,330 B2
(45) Date of Patent: Jul. 7, 2020

(54) METHODS AND SYSTEMS FOR ACCURATELY RECOGNIZING VEHICLE LICENSE PLATES

(71) Applicant: Intellivision Technologies Corp., San Jose, CA (US)

(72) Inventors: Chandan Gope, Derwood, MD (US); Gagan Gupta, Delhi (IN); Nitin Jindal, Faridabad (IN); Amit Agarwal, San Jose, CA (US)

(73) Assignee: Intellivision Technologies Corp, San Jose, CA (US)

( * ) Notice: Subject to any disclaimer, the term of this patent is extended or adjusted under 35 U.S.C. 154(b) by 0 days.

(21) Appl. No.: 15/265,026

(22) Filed: Sep. 14, 2016

(65) Prior Publication Data
US 2017/0300786 A1   Oct. 19, 2017

Related U.S. Application Data

(60) Provisional application No. 62/235,583, filed on Oct. 1, 2015.

(51) Int. Cl.
*G06K 9/62* (2006.01)
*G06T 5/20* (2006.01)
(Continued)

(52) U.S. Cl.
CPC ....... *G06K 9/6267* (2013.01); *G06K 9/00791* (2013.01); *G06T 5/002* (2013.01);
(Continued)

(58) Field of Classification Search
None
See application file for complete search history.

(56) References Cited

U.S. PATENT DOCUMENTS

| 5,315,664 A | 5/1994 | Kumagai |
| 6,026,177 A | 2/2000 | Mong et al. |

(Continued)

FOREIGN PATENT DOCUMENTS

| CN | 102043945 B | 1/2013 |
| CN | 103870803 A | 7/2014 |

(Continued)

OTHER PUBLICATIONS

Wen, Ying & Lu, Yue & Yan, Jingqi & Zhou, Zhenyu & Von Deneen, Karen & Shi, Pengfei. (2011). An Algorithm for License Plate Recognition Applied to Intelligent Transportation System. Intelligent Transportation Systems, IEEE Transactions on. 12. 830-845. 10.1109/TITS.2011.2114346. (Year: 2011).*

(Continued)

*Primary Examiner* — Jiangeng Sun
(74) *Attorney, Agent, or Firm* — Schwegman Lundberg & Woessner, P.A.

(57) ABSTRACT

The present invention discloses methods, systems and computer programmable products for detecting license plates and recognizing characters in the license plates. The system receives an image and identifies one or more regions including a license plate. The one or more regions are converted into a plurality of binarized images, which are then filtered to remove noise. Next, one or more clusters of characters are identified in the plurality of binarized images. The one or more clusters of characters are analyzed to recognize a set of characters, wherein each character in the set includes a confidence value.

20 Claims, 6 Drawing Sheets

(51) Int. Cl.
  *G06T 5/00*   (2006.01)
  *G06K 9/00*   (2006.01)

(52) U.S. Cl.
  CPC ............ *G06T 5/20* (2013.01); *G06K 2209/01* (2013.01); *G06K 2209/15* (2013.01)

(56) References Cited

U.S. PATENT DOCUMENTS

| | | |
|---|---|---|
| 6,473,517 B1 | 10/2002 | Tyan et al. |
| 6,553,131 B1 | 4/2003 | Neubauer et al. |
| 8,059,868 B2 | 11/2011 | Matsumoto et al. |
| 8,320,629 B2 | 11/2012 | Hofman et al. |
| 8,731,244 B2 | 5/2014 | Wu |
| 8,792,682 B2 | 7/2014 | Fan et al. |
| 8,965,123 B2 | 2/2015 | Chattopadhyay et al. |
| 9,092,892 B2 | 7/2015 | Ozawa et al. |
| 9,292,759 B2 | 3/2016 | Burry et al. |
| 9,400,936 B2 | 7/2016 | Bulan et al. |
| 9,547,800 B2 | 1/2017 | Besiris et al. |
| 2005/0029347 A1 | 2/2005 | Noble |
| 2009/0207046 A1* | 8/2009 | Arrighetti ............ G06K 9/3258 340/937 |
| 2012/0275653 A1 | 11/2012 | Hsieh et al. |
| 2013/0148857 A1 | 6/2013 | Yoon et al. |
| 2013/0182910 A1* | 7/2013 | Burry .................. G06K 9/6279 382/105 |
| 2013/0259314 A1* | 10/2013 | Kozitsky ............. G06K 9/3258 382/105 |
| 2014/0376778 A1 | 12/2014 | Muetzel et al. |
| 2016/0203380 A1* | 7/2016 | Bulan .................. G06K 9/6256 382/105 |

FOREIGN PATENT DOCUMENTS

| | | | | |
|---|---|---|---|---|
| CN | 104050450 A | | 9/2014 | |
| CN | 104239864 A | | 12/2014 | |
| CN | 104298976 A | | 1/2015 | |
| CN | 104732227 A | * | 6/2015 | |
| CN | 103065138 B | | 7/2015 | |
| DE | 102005062154 A1 | * | 7/2007 | ......... G06K 9/00818 |
| WO | WO 2014193220 A2 | * | 12/2014 | ......... G06K 9/00973 |

OTHER PUBLICATIONS

Nuzulha Khilwani Ibrahim, License Plate Recognition (LPR), 2013, Melaka, Malaysia.
International Journal of Computer Applications, A Robust Method for Vehicle License Plate Recognition, 2016, India.

* cited by examiner

Exemplary Environment

FIG.1

LPDR System

FIG.2

Exemplary Input Frame

FIG.3

Exemplary Number Plates

METHODS AND SYSTEMS FOR ACCURATELY RECOGNIZING VEHICLE LICENSE PLATES

TECHNICAL FIELD

The present invention generally relates to the field of vehicle license plate identification, and in particular, the present invention relates to methods and systems for detecting a license plate and, accurately detecting and recognizing the characters on the plate.

BACKGROUND

With rapid increase of vehicle sale/purchase, the automatic vehicle identification systems have become imperative for effective traffic control and security applications, such as detecting traffic violations and theft access control to restricted areas, tracking of wanted vehicles, and the like. The most common technique used by automatic vehicle identification systems is the number plate/license plate detection. In this technique, a plurality of regions of interest is identified in an image, and character segmentation is performed using feature extraction mechanisms.

The existing license plate detection techniques use gradient and edge information from one or more filters, along with a sliding window technique. An example of the one or more filters is Sobel. Additionally, a Hough transform based approach is employed. Typically, for representing characters, the existing license plate detection techniques use features such as scale-invariant feature transform (SIFT), Histogram of Gradients (HoG), or Haar-like. In some cases, the features have been supplemented with learning based methods, such as Support Vector Machine (SVM), Boosting, and the like. A major disadvantage of the existing license plate detection techniques is the complexity and the computational burden which results in inaccurate character recognition. As the number of images to be analysed increases, the mechanisms used by the existing license plate detection techniques cannot match up the desired processing speed. Another disadvantage is that the techniques rely on a single learning model. This model is not sufficient to identify license plate formats across countries, or even within states. Further, the techniques cannot accurately recognize characters in low lighting or visibility conditions. Examples include the change of light in day and night, change of weather, and the like. In addition, if the input image/video has low resolution, the character recognition becomes challenging. Therefore, there is a need for an accurate and computationally efficient solution for solving the problem of license plate identification and character recognition.

SUMMARY

An embodiment of the present invention discloses a license plate detection and recognition (LPDR) system. The system comprises of a processor, a non-transitory storage element coupled to the processor and encoded instructions stored in the non-transitory storage element. The encoded instructions when implemented by the processor, configure the LPDR system to detect and recognize license plates in an image. The LPDR system includes an image input unit, a license plate detection unit, a character detection unit, and a character recognition unit. The license plate detection unit further includes a binarization unit and a filtration unit. The image input unit is configured to receive an image, wherein the image input unit receives the image from at least one of an image capturing device, a network, a computer and a memory unit. The license plate detection unit is configured to detect one or more regions in the image, wherein a region of the one or more regions includes a license plate. Further, the binarization unit of the license plate detection unit is configured to generate a set of binarized images of the region using at least one of a multi-scale difference of Gaussian filter and a variable adaptive threshold (T). The variable adaptive threshold (T) is computed based on at least one parameter of a set of parameters computed locally in a window centred at a location in the region. In addition, the filtration unit of the license plate detection unit is configured to remove noise from a binarized image of the set of binarized images based on at least one of a horizontal profile and a vertical profile of the binarized image. Next, the character detection unit is configured to detect one or more clusters of characters in the binarized image based on at least one cluster constraint of the group comprising number of characters, size and orientation of characters, spacing between characters, aspect ratio and slope of characters.

Another embodiment of the present invention discloses a computer programmable product for detecting a region containing a license plate and, detecting and recognizing a set of characters in the region. The computer programmable product is a part of a license plate detection and recognition (LPDR) system. The computer programmable product includes a set of instructions that when executed by a processor of the LPDR system cause the LPDR system to receive an image, wherein the image is received from at least one of an image capturing device, a network, a computer and a memory unit. Next, the computer programmable product detects one or more regions in the image, wherein a region of the one or more regions includes a license plate. For detection, a set of binarized images of the region is generated using at least one of a multi-scale difference of Gaussian filter and a variable adaptive threshold (T), wherein the variable adaptive threshold (T) is computed based on at least one parameter of a set of parameters computed locally in a window centered at a location in the region. Thereafter, noise is removed from a binarized image of the set of binarized images based on at least one of a horizontal profile and a vertical profile of the binarized image. Further, the computer programmable product detects one or more clusters of characters in the binarized image based on at least a cluster constraint of the group comprising number of characters, size and orientation of characters, spacing between characters and slope of characters. A set of characters is recognized from the detected one or more clusters of characters, wherein a character of the set of characters is associated with a confidence value.

Yet another embodiment of the present invention discloses a method for detecting and recognizing a license plate in an image. The method includes receiving an image from at least one of an image capturing device, a network, a computer and a memory unit. Next, one or more regions in the image are detected, wherein a region of the one or more regions includes a license plate. For detection, a set of binarized images of the region is generated using at least one of a multi-scale difference of Gaussian filter and a variable adaptive threshold (T), wherein the variable adaptive threshold (T) is computed based on at least one parameter of a set of parameters computed locally in a window centered at a location in the region. Thereafter, noise is removed from a binarized image of the set of binarized images based on at least one of a horizontal profile and a vertical profile of the binarized image. The method further includes detecting one or more clusters of characters in the binarized image based on at least a cluster constraint of the group comprising number of characters, size and orientation of characters, spacing between characters and slope of characters. A set of characters is recognized from the detected one or more clusters of characters, wherein a character of the set of characters is associated with a confidence value.

DETAILED DESCRIPTION OF DRAWINGS

The present invention will now be described more fully with reference to the accompanying drawings, in which embodiments of the present invention are shown. However, this invention should not be construed as limited to the embodiments set forth herein. Rather, these embodiments are provided so that this invention will be thorough and complete, and will fully convey the scope of the present invention to those skilled in the art. Like numbers refer to like elements throughout.

Overview

The primary purpose of the present invention is to enable devices/machines/systems to identify a vehicle license plate in an image and recognize the characters in the license plate. Here, the image is processed to identify one or more regions that include a license plate. Next, one or more clusters of characters are identified in each of the one or more regions, wherein the identification is made based on at least one of number of characters, size and orientation of characters, spacing between characters, aspect ratio and slope of characters. Finally, each character in the one or more clusters is recognized.

Exemplary Environment

Figure 1:
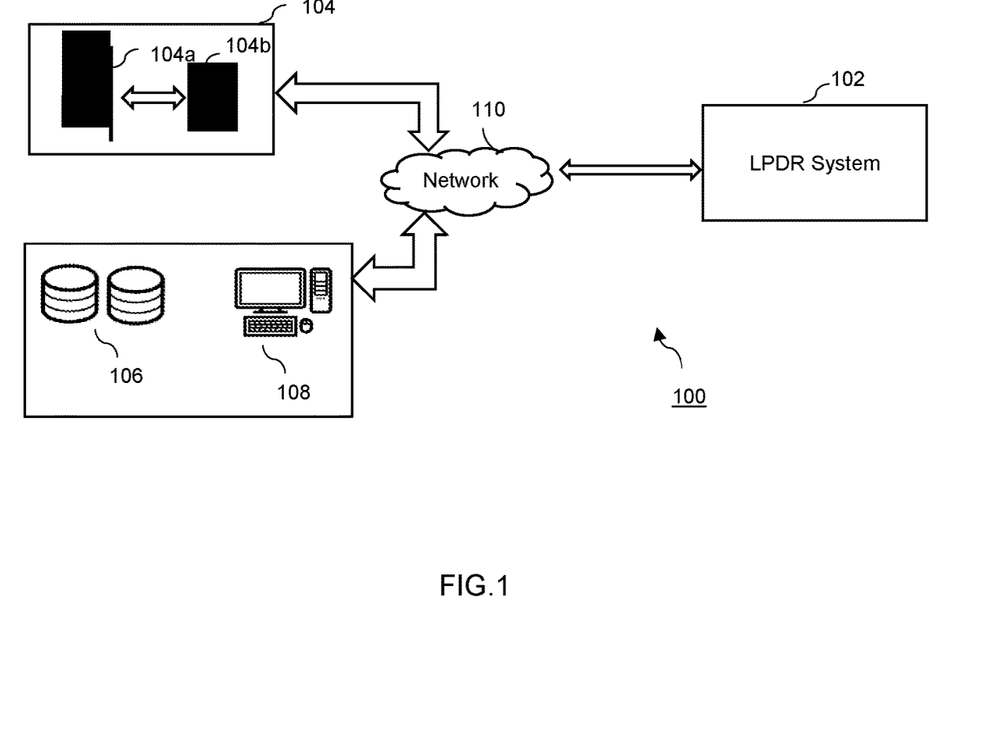
FIG. 1 illustrates an exemplary environment in which various embodiments of the present invention can be practiced.

FIG. 1 illustrates an exemplary environment 100 in which various embodiments of the present invention can be practiced. The environment 100 includes a License Plate Detection and Recognition (LPDR) system 102, a real-time streaming system 104, a video/image archive 106, and a computer system 108. The real-time streaming system 104 includes a video server 104a, and a plurality of video/image capturing devices 104b installed across multiple locations. Examples of locations include, but are not limited to, roads, parking spaces, garages, toll booths, outside residential areas, outside office spaces, outside public places (such as malls, recreational areas, museums, libraries, hospitals, police stations, fire stations, schools, colleges), and the like. The video/image capturing devices 104b include, but are not limited to, Closed-Circuit Television (CCTVs) cameras, High Definition (HD) cameras, non-HD cameras, handheld cameras, or any other video/image grabbing units. The video server 104a of the real-time streaming system 104 receives a dynamic imagery or video footage from the video/image capturing devices 104b, and transmits the associated data to the LPDR system 102. The video/image archive 106 is a data storage that is configured to store pre-recorded or archived videos/images. The video/image archive 106 may be composed of a plurality of local databases or remote databases. Also, the databases may be centralized and/or distributed. In an alternate scenario, the video/image archive 106 may store data using a cloud based scheme. Similar to the real-time streaming system 104, the video/image archive 106 transmits data to the LPDR system 102. The computer system 108 is any computing device remotely located from the LPDR system 102, and stores a plurality of videos/images in its local memory. In an embodiment, the computer system 108 can be replaced by one or more of a computing server, a mobile device, a memory unit, and a handheld device. The real-time streaming system 104, the video/image archive 106, the computer system 108 and the LPDR system 102 are connected over a network 110. In an embodiment of the present invention, the real-time streaming system 104 and/or the computer system 108 may also send data (input frames) to the video/image archive 106 for storage and subsequent retrieval.

The network 110 may be any suitable wired network, wireless network, a combination of these or any other conventional network, without limiting the scope of the present invention. Few examples may include a LAN or wireless LAN connection, an Internet connection, a point-to-point connection, or other network connection and combinations thereof. The network 110 may be any other type of network that is capable of transmitting or receiving data to/from host computers, personal devices, telephones, video/image capturing devices, video/image servers, or any other electronic devices. Further, the network 110 is capable of transmitting/sending data between the mentioned devices. Additionally, the network 110 may be a local, regional, or global communication network, for example, an enterprise telecommunication network, the Internet, a global mobile communication network, or any combination of similar networks. The network 110 may be a combination of an enterprise network (or the Internet) and a cellular network, in which case, suitable systems and methods are employed to seamlessly communicate between the two networks. In such cases, a mobile switching gateway may be utilized to communicate with a computer network gateway to pass data between the two networks. The network 110 may include any software, hardware, or computer applications that can provide a medium to exchange signals or data in any of the formats known in the art, related art, or developed later.

The LPDR system 102 is part of at least one of a surveillance system, a security system, a traffic monitoring system, a home security system and a toll fee system. The LPDR system 102 is configured to receive data from the real-time streaming system 104, the video/image archive 106, and/or the computing system 108. The data can be in form of one or more video streams and/or one or more images. In case of the one or more video streams, the LPDR system 102 converts each stream into a plurality of static images or frames. Broadly, the LPDR system 102 processes the one or more received images (or static image frames of videos) and executes a license plate detection technique. In the detection technique, the one or more images are analysed and one or more regions containing vehicle license plates are detected. Next, for each license plate, the LPDR system 102 recognizes the characters that make up the vehicle license/registration number. In an embodiment of the invention, the LPDR system 102 takes into account the lighting and visibility conditions while performing character recognition. More details will be discussed with reference to FIG. 2.

In addition, license plates of a plurality of countries or states are considered. Lastly, the LPDR system 102 performs a post-processing that includes a temporal based logic. The logic performs a country based format validation, since the permissible character layout varies within countries and even within states. The specific details of the LPDR system 102 will now be explained with respect to FIG. 2.

Exemplary LPDR System

Figure 2:
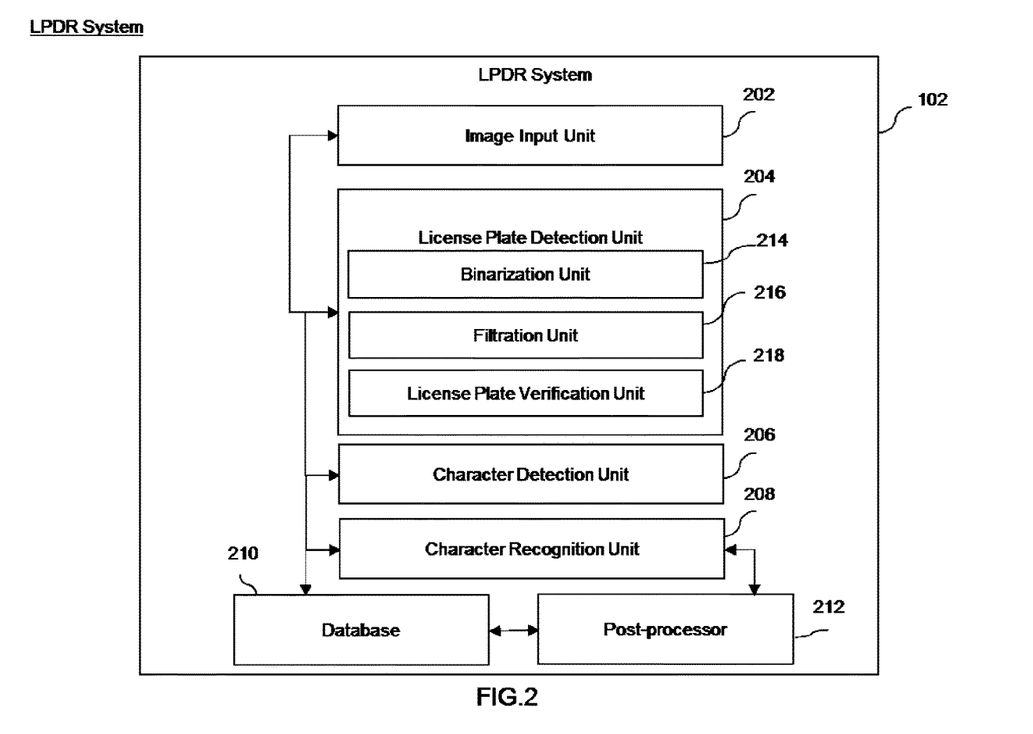
FIG. 2 is the schematic of a License Plate Detection and Recognition (LPDR) system.

FIG. 2 is the schematic of the LPDR system 102. The LPDR system 102 includes a plurality of units—an image input unit 202, a license plate detection unit 204, a character detection unit 206, a character recognition unit 208, a database 210, and a post-processor 212. The license plate detection unit 204 also includes a binarization unit 214, a filtration unit 216, and a license plate verification unit 218. The units 202-218 are configured to send data or receive data to/from each other by means of wired or wireless connections. In an embodiment of the invention, one or more of the units 202-218 may be remotely located. For example, the database 210 may be hosted remotely from the LPDR system 102, and the connection to the database 210 can be established using one or more wired/wireless connections.

The image input unit 202 is configured to receive data from at least one of the real-time streaming system 104, the video/image archive 106, and the computer system 108. The data primarily comprises at least one image captured in real-time by the video/image capturing devices 104b. In an embodiment of the invention, the data corresponds to an image previously stored in the video/image archive 106 or the computer system 108.

Figure 3:
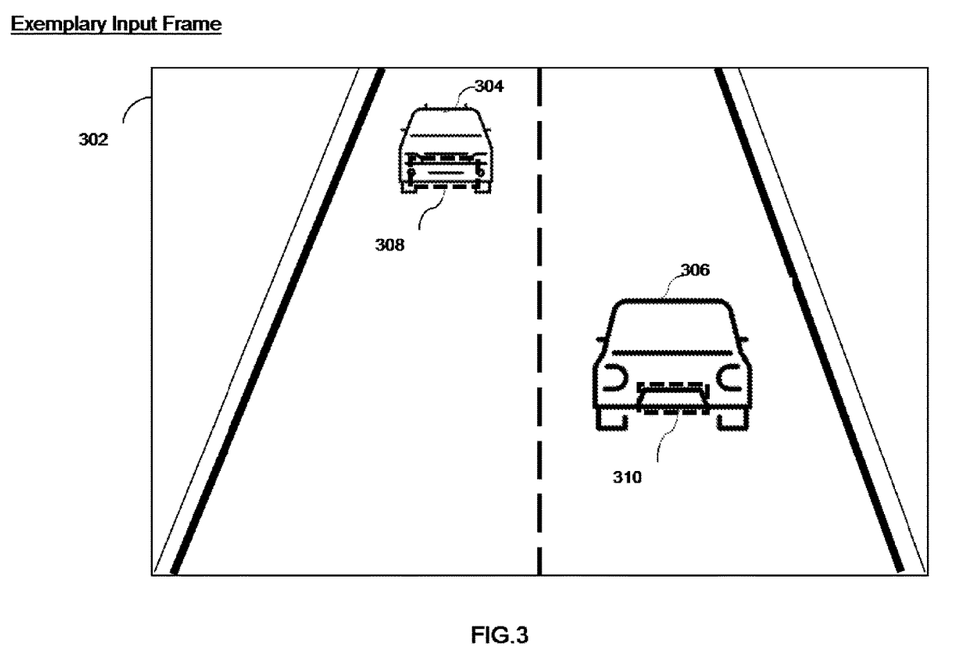
FIG. 3 illustrates an exemplary input frame.

The image input unit 202 sends the image to the license plate detection unit 204. The license plate detection unit 204 analyses the image to identify one or more vehicles, and then one or more regions such that each region includes a license plate. With reference to FIG. 3, an image 302 is received by the image input unit 202, and is transferred to the license plate detection unit 204.

The license plate detection unit 204 scans the image 302 to identify one or more vehicles. The vehicles can be all forms of two-wheelers, three-wheelers, and four-wheelers. The vehicles may also be heavy vehicles, such as buses, trucks and/or any other vehicle having a license plate. In FIG. 3, the one or more vehicles such as a vehicle 304 and a vehicle 306 are shown. The identification of the one or more vehicles is based on the shape and size of the vehicles.

In an embodiment of the invention, if the image input unit 202 receives a video stream (instead of an image), the video stream is divided into a sequence of frames and sent to the license plate detection unit 204. The license plate detection unit 204 is configured to analyse the sequence of frames using object tracking to track the one or more vehicles based on at least one of their shape, size, orientation, and motion. The motion of a vehicle determines an expected location of the vehicle in a frame, such that the expected location of the vehicle is estimated based on speed and location of the vehicle in a previous frame.

The one or more vehicles are detected using a Haar and Adaboost based cascade detector. Alternatively, the license plate detection unit 204 uses a deformable part-based model to detect the one or more vehicles. In another embodiment of the invention, the license plate detection unit 204 runs a selective search based algorithm to first find a plurality of object regions in the image. The plurality of object regions is then scanned using a Histogram of Gradients (HoG) and/or Support Vector Machine (SVM) based classifier to detect the one or more vehicles in the plurality of object regions.

Once the one more vehicles are identified in the image, the license plate detection unit 204 is configured to detect one or more regions within the one more detected vehicles. Each of the one or more regions includes a license plate. License plates detected in the image may be of different sizes. In FIG. 3, the one or more regions correspond to a region 308 and a region 310. For this, the license plate detection unit 204 uses one or more region selection strategies to select the one or more regions that prospectively include one or more license plates. If the image corresponds to an image of a plurality of vehicles at a toll-booth, the number of regions (that likely include license plates) is large, for example within a range of 500-5000. However, if the image corresponds to a relatively less busy intersection of a road, the number of regions is less. Therefore, the range may vary from image to image.

In an embodiment, the license plate verification unit 218 analyses the one or more regions to further narrow these down to a more accurate set of one or more regions that must contain the license plates. This analysis is made by analytically evaluating each region of the one or more regions to detect contours or connected components based on at least one of shape, size, orientation, color, edges, and high transition in edges in both horizontal and vertical directions. For example, if a rectangular shape is detected in a region, the region is selected. In an embodiment of the invention, the license plate verification unit 218 uses machine learning strategies. An example of the machine learning strategies is HoG+SVM classifier.

Once the one or more regions are identified, the binarization unit 214 of the license plate detection unit 204 is configured to generate a set of binarized images for each region of the one or more regions. The binarized images are generated using at least one of a multi-scale Difference of Gaussian (DoG) filter and a Variable Adaptive Threshold (VAT). When the DoG filter is used, a plurality of Gaussian kernels is employed to create a plurality of binarized images corresponding to each region of the one or more regions. In case of the VAT, a threshold value T is calculated based on a plurality of statistical measures or parameters of pixel intensity. The statistical measures include, but are not limited to, mean, median, mode, standard variance, and the like. For a region of the one or more regions (containing one or more license plates), the threshold T is computed locally in a window centred at a location in the region. The threshold T is a measure of any of the plurality of statistical measures. In another embodiment of the invention, the threshold T is a value that optimizes one or more criteria. An example of the one or more criteria includes, but is not limited to, inter-class variance. Using the VAT technique, the binarization unit 214 creates a list of thresholds, wherein the list of thresholds comprises N values in the range of $\{f^*T, g^*T\}$, where $f<1$ and $g>1$. The N values correspond to the set of binarized images for each of the one or more regions.

The set of binarized images is sent to the filtration unit 216 of the license plate detection unit 204. The filtration unit 216 is configured to process the set of binarized images to remove noise. An example of noise includes, but is not limited to, non-character data on the boundaries of license plates. Essentially, the set of binarized images may contain noise around the one or more license plates, and/or noise around the sequence of characters within the one or more license plates. To remove the noise, the filtration unit 216 applies a horizontal profile and a vertical profile on a binarized image of the set of binarized images. The horizontal and vertical profiles are generated based on one or more transition points identified by scanning the binarized image. Each of the one or more transition points represents one of a transition from black to white and a transition from white to black. For example, for the horizontal profile, while scanning the binarized image line by line horizontally, one or more pivot points are calculated as transition points of pixel values from 0-255 or 255-0. Accordingly, the horizontal and vertical profiles are used to remove noise such as, but are not limited to, long horizontal edges at bottom of characters, small edges joining two or more characters, and the like. Once the noise is removed, the filtration unit 216 adjusts the boundaries of the set of binarized images.

The character detection unit 206 is configured to receive the filtered binarized images corresponding to the one or more license plates, and detect one or more clusters of characters in each of the filtered binarized images. The detection is made based on at least one cluster constraint, such as, but is not limited to, number of characters, size and orientation of characters, spacing between characters, aspect ratio and slope/alignment of characters. Further, the clusters may be identified by detecting and discarding one or more hyphens. The one or more hyphens are detected by using one or more profiles in the horizontal and vertical direction. For the vertical direction, a window of a pre-determined small height and width is moved from top to bottom on the cluster of characters, and the corresponding pixel value is stored in a list. For the horizontal direction, a window of pre-determined long height and small width is moved horizontally, and the corresponding pixel value is again stored in the list. Using the pixel values the one or more hyphens are detected, and the one or more clusters of characters are detected. The one or more clusters of characters are then sent to the character recognition unit 208.

The character recognition unit 208 is configured to recognize a set of characters from the detected one or more clusters of characters. The set of characters together constitutes the license number. For recognizing characters in the English language, the set of numeric characters from 0-9 and alphabetical characters A-Z or a-z are considered. The character recognition unit 208 uses a classifier that is based on supervised and/or unsupervised machine learning. For the supervised machine learning, training data may use any of the classification models and/or regression models. In case of unsupervised learning, a new feature transformation is automatically learnt using an autoencoder neural network. The autoencoder neural network consists of multiple hidden layers and accepts either the pixel data or one or more transformed representations of the pixel data as input. The problem of over-fitting is avoided by regularizing the autoencoder neural network. Next, the autoencoder neural network is fine-tuned where class-labels are utilized to train the network. The final output layer of the network can be either a soft-max or any other classifier. Essentially, the autoencoder neural network provides a confidence value to each recognized character. Example, for a recognised character "K", a confidence value 99% may be associated post computation. In another example, for a recognized character "8", a confidence value 38% may be computed, wherein the low confidence value signifies that possibly the character "8" may also correspond to a character "B". The confidence value can be represented in a plurality of formats, such as, but not limited to, percentage, percentile, a whole number, a fraction, and the like.

In an embodiment of the invention, the classifier of the character recognition unit 208 uses at least one of a geometric, photometric, and a noise transformation on a plurality of images to generate a large number of training images. The training images cover a plurality of variations, such as font types, font size, font style, and the like. These training images are then used for machine learning, both supervised and/or unsupervised. In another embodiment of the invention, the character recognition unit 208 takes into account the lighting and visibility conditions while performing character recognition. The training images are transformed artificially to simulate a plurality of conditions, such as, but not limited to, visibility, lighting, noise and blur conditions. Using the training images, a machine learning model is built and applied while recognizing characters.

The set of recognized characters is sent to the post-processor 212 for validation. The post-processor 212 is configured to perform the validation based on at least one of spatial arrangement of characters, a frequency of occurrence of characters and a set of pre-determined rules. In case of the spatial arrangement of characters, the post-processor 212 performs a temporal validation by considering placement of the set of recognized characters across a plurality of image frames. The set of characters that denotes a different alignment or placement in a minority of frames, are flagged as outliers and discarded.

The temporal validation is also used to examine the frequency of occurrence of characters across the plurality of image frames. In this case, the set of characters is considered at various time intervals. For example, in a set of 10 images (containing one or more regions with one or more license plates), a recognized character was "B" in 6 out of 10 frames, and had a confidence value of 60%. For the remaining 4 frames, the character was recognized as "8" and had a confidence value of 95%. The post-processor 212 then computes a weighted probability for the two cases using the formula:

$$(\text{number of frames that recognized the character/total number of frames})*\text{confidence value in percentage}$$

For the character "B", the weighted probability is: (6/10)*(60/100)=0.36. For the character "8", the weighted probability is (4/10)*(95/100)=0.38. Based on the computed weighted probability, the character invalidated as "8" and not "B".

The post-processor 212 also uses a set of pre-determined rules during validation. In an embodiment of the invention, the pre-determined rules correspond to rules learnt via machine learning based models. In an example, a machine learning based model is built to learn a plurality of license plate formats in a particular country or region. According to the model, the first character of a state's license plate format starts with only a number. However, if the character recognition unit 208 recognized the first character as a letter "I", the post-processor 212 uses the model to correct it to number "1", since the probability of the character being "1" is more than it being "I". The validated set of recognized characters is then saved to the database 210. The set can be retrieved/accessed by one or more agents, users, or entities. Examples include, but are not limited to, law enforcement agents, traffic controllers, residential users, security personnel, and the like. The retrieval/access can be made by use of one or more devices. Examples of the one or more devices include, but are not limited to, smart phones, mobile devices/phones, Personal Digital Assistants (PDAs), computers, work stations, notebooks, mainframe computers, laptops, tablets, internet appliances, and any equivalent devices capable of processing, sending and receiving data.

In an embodiment of the invention, a law enforcement agent accesses the LPDR system 102 using a mainframe computer. The law enforcement agent can input a license number on an interface of the mainframe computer. The input is then matched by the LPDR system 102 with the set of recognized characters stored in the database 210. If a match is found, the image that corresponded to the matched characters is tracked, along with other supplementary information such as, but not limited to, a geo-tag, a time stamp, and the like. This way the law enforcement agent can track the whereabouts of the vehicle with the required license number. In another embodiment of the invention, a traffic controller monitors key traffic prone areas. In case a vehicle violates a traffic rule (such as jumps a traffic light), the traffic controller makes note of the license number of the vehicle.

It may be understood that in an embodiment of the present invention, the units 202-214 may be in the form of hardware components, while in another embodiment, the units 202-214 may be in the form of software entities/modules. In yet another embodiment of the present invention, the units may be a combination of hardware and software modules. Further, the LPDR system 102 may be a part of at least one of the group comprising a mobile phone, a computer, a server, or a combination thereof.

Figure 5:
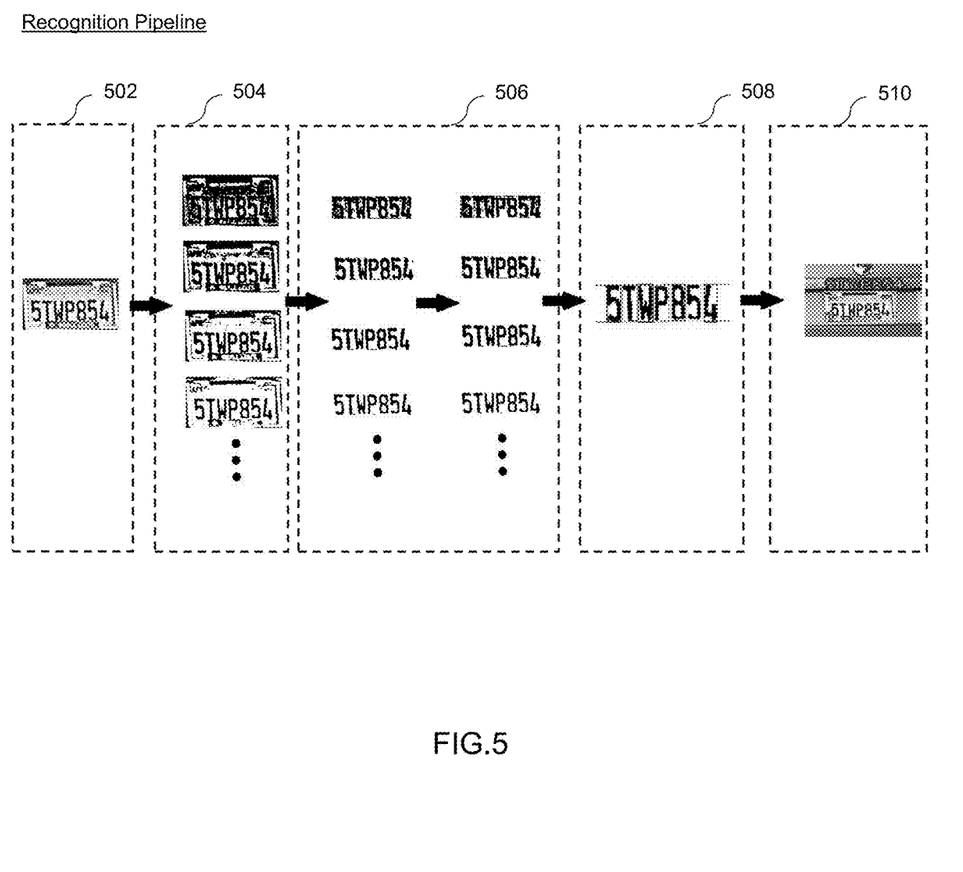
FIG. 5 illustrates a process flow executed by the LPDR system.
Figure 6:
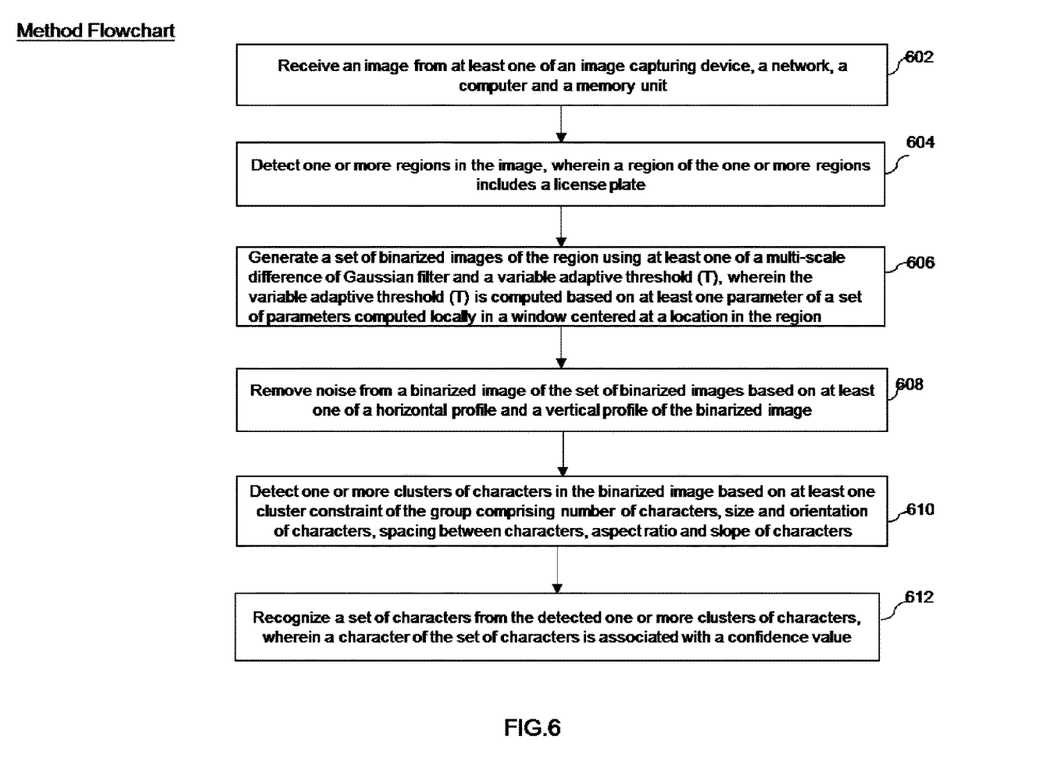
FIG. 6 is a method flowchart for detecting and recognizing license plates.

Method Flowchart:

FIG. 6 is a method flowchart for detecting and recognizing license plates. The method will be discussed in conjunction with FIG. 4A, FIG. 4B and FIG. 5. At 602, the LPDR system 102 receives an image to be analysed. The image is captured by one or more devices. The one or more devices include at least one of an image capturing device, a network, a computer and a memory unit. In an embodiment of the invention, the one or more devices may transfer a video stream instead of an image. For such cases, the LPDR system 102 divides the video stream into a sequence of frames. At 604, the LPDR system 102 detects one or more regions in the image, wherein a region of the one or more regions includes a license plate. For detecting the one or more regions, the LPDR system 102 first identifies one or more vehicles in the image based on at least one of their shape, size, orientation, and motion. The techniques used for vehicle identification can be implemented using a Haar and Adaboost based cascade detector, a deformable part based model, Histogram of Gradients (HoG) and/or Support Vector Machine (SVM) based classifier, and the like.

In an embodiment of the invention, once the one or more vehicles are identified, the LPDR system 102 identifies the one or more regions that likely include one or more license plates. This identification is made by analytically detecting contours or connected components based on at least one of shape, size, orientation, color, edges, and high transition in edges in both horizontal and vertical direction. In FIG. 5, an example of the one or more regions is a region 502 that includes a license plate.

At 606, the region 502 is converted into a set of binarized images 504 using at least one of a multi-scale Difference of Gaussian (DoG) filter and a Variable Adaptive Threshold (VAT). In case of VAT, a threshold T is computed locally in a window centred at a location in the region 502. This computation is based on at least one parameter of a set of parameters including, but not limited to, mean, median, mode, standard variance, and the like. Next, at 608, the LPDR system 102 filters each binarized image of the set of binarized images 504 to remove noise based on at least one of a horizontal profile and a vertical profile of the binarized image. A noise is essentially non-character data on the boundaries on the license plate in the region 502. After noise removal, the set of binarized images 504 is converted to a set of filtered binarized images 506.

Figure 4A:
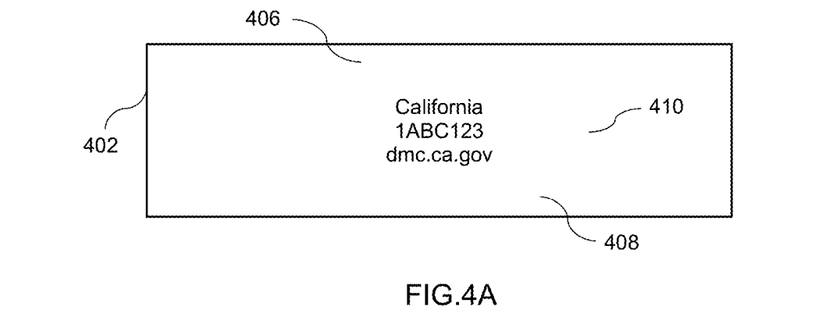
FIG. 4A and FIG. 4B illustrate exemplary layouts of license plates.
Figure 4B:
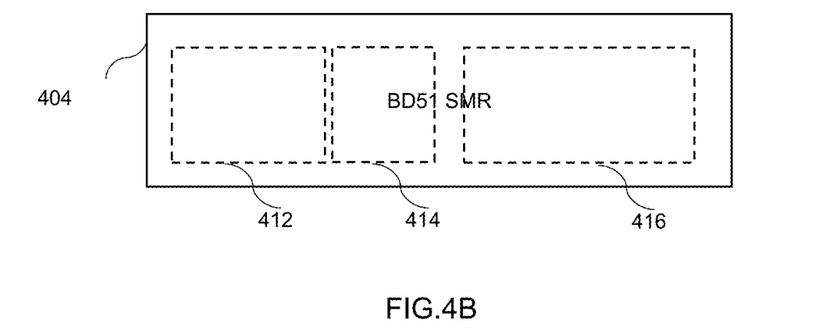

At 610, the LPDR system 102 detects one or more clusters of characters in the set of filtered binarized images 504 based on at least one cluster constraint. Examples of the cluster constraint include, but are not limited to, number of characters, size and orientation of characters, spacing between characters, aspect ratio and slope of characters. In FIG. 4A, a license plate 402 corresponds to a permissible license plate format in the state of California, and in FIG. 4B, a license plate 404 corresponds to a permissible license plate format in the United Kingdom. In the license plate 402, the one or more clusters of characters correspond to a cluster 406, a cluster 410, and cluster a 408. Similarly, in the license plate 404, the one or more clusters correspond to a cluster 412, a cluster 414, and a cluster 416. In an embodiment, the clusters are identified by detecting a hyphen. In another embodiment, other non-characters, such as line break or word space can be considered. In yet another embodiment, the LPDR system 102 uses machine learning to identify a set of possible character layouts and alignment to create clusters. For example, in the state of California, a standard license plate includes the phrase "California" in the first line, a string of characters in the second line, and the phrase "dmc.ca.gov" in the third line. Further, the string of characters follows the nomenclature 1ABC123. In another example, for license plates in the United Kingdom, the first two characters signify the state/city (in FIG. 4B, "BD" signifies Birmingham) followed by a two number vehicle age identifier (in FIG. 4B, "51" represents September 2001), and lastly any three random characters. The LPDR system 102 can learn this layout/representation/alignment to accurately create one or more clusters of characters. In FIG. 5, a cluster 508 is detected for the plurality of filtered binarized images 506.

At 612, the LPDR system 102 recognizes a set of characters from the detected clusters 508. The recognition is made using a classifier that is based on supervised and/or unsupervised machine learning, and the classifier assigns a confidence rating to each recognized character of the set of characters. Using the classifier, the LPDR system 102 recognizes the characters in the license plate 510. The recognized characters are then saved to the database 210 for subsequent retrieval.

The LPDR system 102, as described in the present invention or any of its units, may be embodied in the form of a computer system. Typical examples of a computer system include a general-purpose computer, a programmed microprocessor, a micro-controller, a peripheral integrated circuit element, and other devices or arrangements of devices that are capable of implementing the method of the present invention.

The computer system comprises a computer, an input device, a display unit and the Internet. The computer further comprises a microprocessor. The microprocessor is connected to a communication bus. The computer also includes a memory. The memory may include Random Access Memory (RAM) and Read Only Memory (ROM). The computer system further comprises a storage device. The storage device can be a hard disk drive or a removable storage drive such as a floppy disk drive, optical disk drive, etc. The storage device can also be other similar means for loading computer programs or other instructions into the computer system. The computer system also includes a communication unit. The communication unit allows the computer to connect to other databases and the Internet through an I/O interface. The communication unit allows the transfer as well as reception of data from other databases. The communication unit may include a modem, an Ethernet card, or any similar device which enables the computer system to connect to databases and networks such as LAN, MAN, WAN and the Internet. The computer system facilitates inputs from a user through input device, accessible to the system through I/O interface.

The computer system executes a set of instructions that is stored in one or more storage elements, in order to process input data. The storage elements may also hold data or other information as desired. The storage element may be in the form of an information source or a physical memory element present in the processing machine.

The set of instructions may include one or more commands that instruct the processing machine to perform specific tasks that constitute the method of the present invention. The set of instructions may be in the form of a software program. Further, the software may be in the form of a collection of separate programs, a program module with a larger program or a portion of a program module, as in the present invention. The software may also include modular programming in the form of object-oriented programming. The processing of input data by the processing machine may be in response to user commands, results of previous processing or a request made by another processing machine.

Embodiments described in the present disclosure can be implemented by any system having a processor and a non-transitory storage element coupled to the processor, with encoded instructions stored in the non-transitory storage element. The encoded instructions when implemented by the processor configure the system to detect and recognize license plates discussed above in FIGS. 1-6. The systems shown in FIGS. 1 and 2 can practice all or part of the recited methods (FIGS. 5 and 6), can be a part of the recited systems, and/or can operate according to instructions in the non-transitory storage element. The non-transitory storage element can be accessed by a general purpose or special purpose computer, including the functional design of any special purpose processor. Few examples of such non-transitory storage element can include RAM, ROM, EEPROM, CD-ROM or other optical disk storage or other magnetic. The processor and non-transitory storage element (or memory) are known in the art, thus, any additional functional or structural details are not required for the purpose of the current disclosure.

For a person skilled in the art, it is understood that these are exemplary case scenarios and exemplary snapshots discussed for understanding purposes, however, many variations to these can be implemented in order to detect and track objects in video/image frames.

In the drawings and specification, there have been disclosed exemplary embodiments of the present invention. Although specific terms are employed, they are used in a generic and descriptive sense only and not for purposes of limitation, the scope of the present invention being defined by the following claims. Those skilled in the art will recognize that the present invention admits of a number of modifications, within the spirit and scope of the inventive concepts, and that it may be applied in numerous applications, only some of which have been described herein. It is intended by the following claims to claim all such modifications and variations which fall within the true scope of the present invention.

We claim:

1. A license plate detection and recognition system with temporal validation, said system comprising:
    a license plate detection unit;
    a character detection unit;
    a character recognition unit;
    a post-processor;
    a processor, a memory element coupled to the processor, and encoded instructions, when implemented by the processor, cause the system to:
        detect one or more regions within one and/or a plurality of captured or stored image frames comprising a license plate within a detected vehicle by the license plate detection unit;
        detect one or more clusters of characters in each of a filtered binarized image of the detected regions and send the one or more detected clusters to the character recognition unit for recognition of characters;
        send the recognized characters to the post-processor for temporal validation, wherein the post-processor considers placement of the recognized characters across a plurality of image frames and a set of characters that denote a different alignment or placement in a minority of frames are flagged as outliers and discarded; and
        compute a weighted probability for each of any remaining recognized characters with an ambiguity (at least two character possibilities) by multiplying a number of frames that recognized the character/total number of frames by a confidence value in percentage for each of the at least two character possibilities and validate the character with the higher weighted probability, thereby resolving the ambiguity.

2. The system for detecting and recognizing a license plate of claim 1, further comprising receiving the image frames from at least one of an image capturing device, a network and a memory unit.

3. The system for detecting and recognizing a license plate of claim 1, wherein the image frame is a frame of a video.

4. The system of claim 1, further comprising a license plate verification unit configured to detect the one or more regions in the image based on at least one of the group comprising color, edges, transition in edges, shape, size, orientation, Histogram of Gradients (HoGs) and a machine-learning based classifier.

5. The system of claim 1, wherein each of a horizontal profile and a vertical profile of the binarized image is generated based on one or more transition points identified by scanning the binarized image, wherein each of the one or more transition points represents one of a transition from black to white and a transition from white to black.

6. The system of claim 1, further comprising a character recognition unit that recognizes a set of characters using a classifier, and wherein the classifier is based on at least one of a supervised and an unsupervised machine-learning network.

7. The system of claim 1, wherein the temporal validation assigns a higher weight to image frames that are at least one of significant or of a higher image quality in computing the weighted probability.

8. The system of claim 7, wherein the significance is pre-determined and the higher image quality is determined based on image sharpness.

9. The system of claim 1, further comprising a license plate detection unit for detecting license plates of at least different sizes or formats.

10. The system of claim 1, wherein the license plate detection unit is further configured to create a list of thresholds based on a variable adaptive threshold (T), wherein the list of thresholds comprises N values in the range of $\{f*T, g*T\}$, where $f<1$ and $g>1$.

11. The system of claim 1, further comprising a set of parameters comprising at least one of a group comprising a mean, a median, a mode and a standard deviation of pixel intensity in a window.

12. The system of claim 1, further configured to detect one or more vehicles in the image.

13. A license plate detection and recognition system using temporal validation to resolve any ambiguity of a recognized character, said system comprising:
   a post-processor;
   a processor, a memory element coupled to the processor, and encoded instructions, when implemented by the processor, cause the system to:
      send recognized characters from a detected one or more clusters of characters in each of a filtered binarized image of detected regions within one and/or a plurality of captured or stored images frames comprising at least a portion of a license plate to the post-processor for temporal validation, wherein the post-processor considers placement of the recognized characters across a plurality of image frames and a set of characters that denote a different alignment or placement in a minority of frames are flagged as outliers and discarded; and
      compute a weighted probability for each of any remaining recognized characters with an ambiguity (at least two character possibilities) by multiplying a number of frames that recognized the character/total number of frames by a confidence value in percentage for each of the at least two character possibilities and validate the character with the higher weighted probability, thereby resolving the ambiguity.

14. The system of claim 13, further comprising a license plate verification unit configured to detect the one or more regions in the image based on at least one of the group comprising color, edges, transition in edges, shape, size, orientation, Histogram of Gradients (HoGs) and a machine-learning based classifier.

15. The system of claim 13, wherein each of a horizontal profile and a vertical profile of the binarized image is generated based on one or more transition points identified by scanning the binarized image, wherein each of the one or more transition points represents one of a transition from black to white and a transition from white to black.

16. The system of claim 13, further comprising a character recognition unit that recognizes a set of characters using a classifier, and wherein the classifier is based on at least one of a supervised and an unsupervised machine-learning network.

17. The system of claim 13, wherein the post processor is further configured to validate the set of characters based on at least one of the group comprising spatial arrangement of characters, frequency of occurrence of characters and a set of pre-determined rules.

18. The system of claim 13, wherein the license plate detection unit is further configured to create a list of thresholds based on a variable adaptive threshold (T), wherein the list of thresholds comprises N values in the range of $\{f^*T, g^*T\}$, where $f<1$ and $g>1$.

19. The system of claim 13, further comprising a set of parameters comprising at least one of a group comprising a mean, a median, a mode and a standard deviation of pixel intensity in a window.

20. A license plate detection and recognition method using temporal validation to resolve any ambiguity of a recognized character, said method comprising the steps of:
   detecting one or more regions within one and/or a plurality of captured or stored image frames comprising a license plate within a detected vehicle by the license plate detection unit;
   detecting one or more clusters of characters in each of a filtered binarized image of the detected regions and send the one or more detected clusters to the character recognition unit for recognition of characters;
   sending the recognized characters to the post-processor for temporal validation, wherein the post-processor considers placement of the recognized characters across a plurality of image frames and a set of characters that denote a different alignment or placement in a minority of frames are flagged as outliers and discarded; and
   computing a weighted probability for each of any remaining recognized characters with an ambiguity (at least two character possibilities) by multiplying a number of frames that recognized the character/total number of frames by a confidence value in percentage for each of the at least two character possibilities and validating the character with the higher weighted probability, thereby resolving the ambiguity.

* * * * *